April 21, 1942. M. K. SHIPMAN 2,280,315
STAGE EFFECT AND DISPLAY DEVICE
Filed Oct. 11, 1939
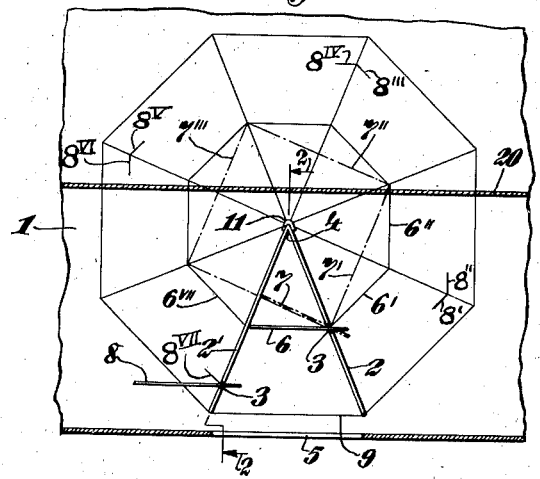
Fig. 1
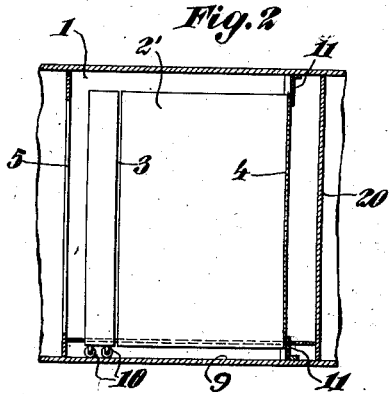
Fig. 2
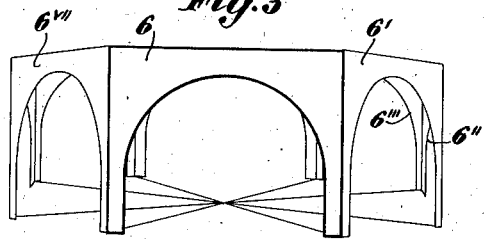
Fig. 3
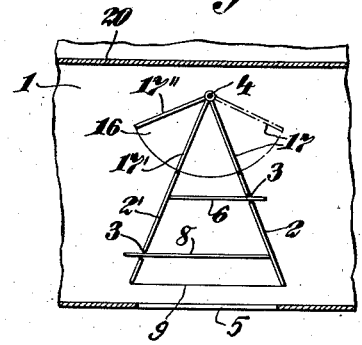
Fig. 6
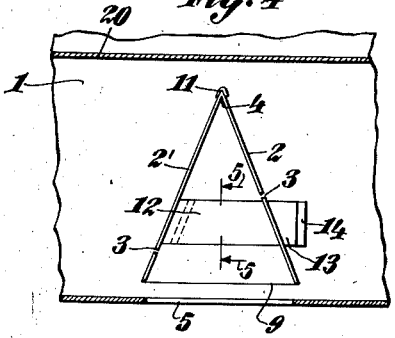
Fig. 4
Fig. 5
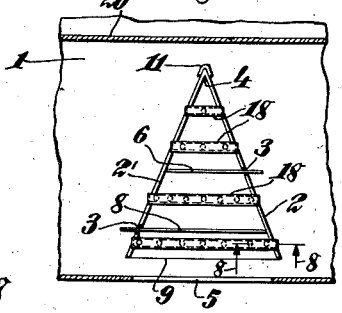
Fig. 7
Fig. 8
INVENTOR.
Mildred Knapp Shipman,
BY Alexander Chessin
her ATTORNEY.

Patented Apr. 21, 1942

2,280,315

UNITED STATES PATENT OFFICE 2,280,315

STAGE EFFECT AND DISPLAY DEVICE

Mildred Knapp Shipman, San Francisco, Calif.

Application October 11, 1939, Serial No. 298,917
In Australia February 9, 1939

4 Claims. (Cl. 272—13)

My invention relates to stage and display devices designed to create illusions by means of certain arrangements of mirrors and, more particularly, to devices of this nature wherein objects presented to the view of an observer can be made to assume different geometrical configurations.

All devices of this character have one general feature in common, namely, the illusion of a kaleidoscopic multiplication of the object presented to view, as is disclosed in my Australian Patents Nos. 12,916, 13,092 and 13,216, all of 1908. In the present invention, various specific objects are aimed at. One of these objects is a sectional arrangement of one or more of the reflecting surfaces, the several sections being spaced from one another to allow the introduction of auxiliary members of the display. Another object is to effect different geometrical configurations by varying the position of such auxiliary members relatively to the reflecting surfaces. Still another object is to create intensely illumined regions within the space presented to view by causing a concentration of direct and reflected light within specified portions of this space. A further object is to give different colors to the thus lighted regions. Many other objects, not specifically mentioned now, will become apparent from the specification which follows and from the accompanying drawing.

In the drawing, Figure 1 is a plan view of one embodiment of my invention. Figure 2 is a cross section taken along the line 2—2 of Fig. 1. Figure 3 is a somewhat diagrammatic view of the illusion as seen by an observer facing the opening of the device shown in Figs. 1 and 2. Fig. 4 is a plan view of the same device, except for the addition of a movable slide under a transparent portion of the flooring. Figure 5 is a cross section taken along the line 5—5 of Figure 4. Figure 6 is a plan view of another embodiment of my invention. Figure 7 is a plan view of the arrangement of lights used in connection with my invention. Figure 8 is a detail, namely, a cross section taken along the line 8—8 of Figure 7.

It is to be noted that Figures 4, 5 and 7, 8, are not variants of the device shown in Figures 1 and 2, but parts of this device. The provision of a slide (Figs. 4, 5) and the arrangement of lights (Figs. 7, 8) are shown separately merely in order not to confuse the drawing.

Referring to Figures 1–5, 7 and 8, in detail, 1 is an enclosure having a frontal opening 5 and a back wall 20. Within the enclosure 1 is a horizontal platform 9 on which rests a pair of walls 2, 2', having reflecting surfaces facing one another and meeting along a vertical line 4—4. The two walls 2 and 2' are secured to one another by a bracket 11. As shown, the angle between the walls is one of 45 degrees, but the angle may, of course, be different, provided it is a divisor of 360°, which is a requirement that must be satisfied in order to get the illusion of a complete, regular geometrical configuration. In the illustration, the geometrical figure has eight sides. If it is desired to allow changes in the angle between the two walls 2 and 2', one only has to provide the brackets 11 with hinges. The wall 2 is made up of two uniplanar mirrors spaced from one another at 3. A similar arrangement is shown for the wall 2', except that the space 3 is at a different place. While only two mirrors are shown in each wall, the walls may, of course, be made up of more sections, or one of them may be solid while the other is sectional. Through the open space 3 of the wall 2, an auxiliary member of the display, 6, is introduced, abutting the opposite wall. This member may be a partition in the form of an arch, as seen in Figure 3, reproduced by reflection as $6^I$, $6^{II}$ . . . $6^{VII}$. If the auxiliary member is moved to the position 7 (Fig. 1), it will be reflected in the mirrors as 7, $7^I$, $7^{II}$, $7^{III}$, i. e., the illusion will be a geometrical configuration of four sides only, instead of the eight sides of the figure formed by the member 6. Thus, a variety of geometrical configurations may be effected by merely shifting the position of the member 6. Instead of passing the auxiliary member through the space between the mirrors of one wall clear to the opposite wall, it may be only partly introduced, like the member 8 in Fig. 1. The reflected reproductions of the member 8 are shown in the figure, identified by the numerals $8^I$, $8^{II}$, $8^{III}$, $8^{IV}$, $8^V$, $8^{VI}$, $8^{VII}$. The sections of a wall made up of several mirrors may be mounted on wheels or rollers 10 (Fig. 2) to facilitate their movement and change the amount of spacing between them to accord with the dimensions of the auxiliary members 6, 7 or 8. It is not necessary to have the auxiliary members extend all the way to the top of the walls 2, 2'. Experience has shown that an open space between the mirrors, unless unduly wide, has no detrimental effect on the illusion.

An additional illusion may be provided by moving a slide, such as the slides 13, 14, in Figures 4 and 5, under a transparent section 12 of the platform 9. The slides are held in place by slats 15. By moving two such colored or variegated slides back and forth in opposite directions, various illusions may be produced, such, for instance, as a rippling brook.

While standard illumination may, of course, be used in conjunction with my invention, novel and interesting light effects may be produced by the arrangement shown in Figures 7, 8. As shown, a series of inverted troughs 18 is secured to a ledge 21 on top of the walls 2, 2', bridging over and across the V-shaped space between the two walls. A multiplicity of lamps 19 are set into the bases of the troughs 19. The inner surfaces of the troughs are preferably lined to reflect the light. The lamps 19 are longitudinally aligned. The troughs are of such a depth that the radiation of the lamps outside the troughs does not appreciably extend transversely to the troughs, so that a transversely confined, illumined region is created under each trough, extending from a wall 2 to the opposite wall 2'. This concentrated illumination is greatly intensified by the reflected radiation in the wall mirrors, which is also concentrated, like the direct radiation. When auxiliary members, such as 6 and 8, in Figure 7, are introduced, the troughs are arranged midway between them, so that each illumined region is localized between two auxiliary members throughout the geometrical configuration of the illusion. Beautiful effects are thus obtained when the several illumined regions are given different colors.

The invention illustrated in Figure 6 differs from that shown in Figure 1 in that a part of the horizontal platform 9, namely, the part 16, is rotatable about the vertical axis 4—4. On the platform 16, three mirrors 17, 17' and 17'', are arranged to form two V-shaped compartments. The mirror 17' is a double mirror, i. e., it has reflecting surfaces on both sides. The platform 16 need not be level with the platform 9. In fact, the stationary part of the platform 9 may have several levels, so that a terraced flooring is obtained. Nor need the flooring be horizontal, even though the platform is, as the flooring may be built up on the horizontal platform in any desired shape. The stationary mirrors 2, 2', are so disposed angularly that their reflecting surfaces are flush with the mirrors of any one of the V-shaped compartments formed by the mirrors 17, 17', 17'', when facing the frontal opening 5. The modification of my invention illustrated in Figure 6 has certain advantages over the one shown in Figure 1. It affords additional diversification. By rotating the platform 16, one or the other of the two V-shaped compartments formed by the mirrors 17, 17', 17'', is brought to view of the observer facing the frontal opening 5, and while this particular compartment is on view, the contents of the other compartment can be changed or re-arranged. Of course, the novel illumination shown in Figures 7, 8, and the slide arrangement shown in Figures 4, 5, are equally applicable to the modified invention illustrated in Figure 6.

It is believed that the above illustrative examples of my invention are sufficient to enable those skilled in the art to make other modifications, or to make additions to them, or to change or omit details, all within the scope and the spirit of my invention, the construction and operation of which is made clear by these examples.

I claim:

1. A stage or display device comprising an enclosure, a horizontal platform within said enclosure, a pair of walls on said platform having reflecting surfaces facing one another and meeting along a vertical line at an angle which is a divisor of 360°, at least one of said walls being composed of uniplanar mirrors separated by narrow open spaces, and auxiliary members introduced into the compartment formed by said walls through the open spaces between said mirrors.

2. A stage or display device comprising an enclosure having a frontal opening, a horizontal platform within said enclosure, a plurality of mirrors on said platform meeting along a vertical line and forming compartments of the same V-shaped cross section, said platform and mirrors being jointly rotatable about said vertical line, a stationary horizontal platform within said enclosure forming an extension of said rotatable platform, a pair of stationary vertical walls angularly disposed on said stationary platform having reflecting surfaces flush with and forming continuations of the reflecting surfaces of the mirrors of any one of said compartments when in position facing said frontal opening, at least one of said walls being composed of spaced uniplanar mirrors, and auxiliary members introduced through the spaces between said uniplanar mirrors.

3. A stage or display device comprising an enclosure, a horizontal platform within said enclosure, a pair of walls on said platform having reflecting surfaces facing one another and meeting along a vertical line at an angle which is a divisor of 360°, at least one of said walls being composed of uniplanar mirrors separated by narrow, open slits, auxiliary members introduced through said open slits, a series of parallel inverted troughs across the tops of said walls intermediate said auxiliary members, and a multiplicity of lamps in longitudinal alignment set in the bases of said troughs, said troughs being of sufficient depth to effect transverse confinement of direct radiation from said lamps, and said direct radiation cooperating with its reflection in said reflecting surfaces to define a series of intensely illumined regions between said auxiliary members.

4. A stage or display device comprising an enclosure having a frontal opening, a horizontal platform within said enclosure, vertical mirrors on said platform forming two V-shaped compartments, said platform and mirrors being jointly rotatable about a vertical axis, a stationary horizontal platform within said enclosure forming an extension of said rotatable platform, two vertical walls angularly disposed on said stationary platform having reflecting surfaces flush with and forming continuations of said mirrors when the corresponding compartment faces said frontal opening, at least one of said walls being composed of spaced uniplanar mirrors, and the angle of said V being a divisor of 360°.

MILDRED KNAPP SHIPMAN.